United States Patent
Chickering

(10) Patent No.: US 9,497,179 B2
(45) Date of Patent: *Nov. 15, 2016

(54) PROVISIONING LAYER THREE ACCESS FOR AGENTLESS DEVICES

(71) Applicant: JUNIPER NETWORKS, INC., Sunnyvale, CA (US)

(72) Inventor: Roger A. Chickering, Granite Bay, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,094

(22) Filed: Jan. 6, 2014

(65) Prior Publication Data

US 2014/0123217 A1    May 1, 2014

Related U.S. Application Data

(63) Continuation of application No. 11/857,084, filed on Sep. 18, 2007, now Pat. No. 8,627,447.

(51) Int. Cl.
*H04L 29/06* (2006.01)

(52) U.S. Cl.
CPC ........... *H04L 63/08* (2013.01); *H04L 63/0263* (2013.01); *H04L 63/104* (2013.01); *H04L 63/20* (2013.01)

(58) Field of Classification Search
CPC ..................................................... H04L 63/08
USPC .............................................................. 726/3
See application file for complete search history.

(56) References Cited

U.S. PATENT DOCUMENTS

| | | | |
|---|---|---|---|
| 5,708,654 A | 1/1998 | Arndt et al. | |
| 6,393,484 B1 * | 5/2002 | Massarani | H04L 29/12018 709/225 |
| 6,957,275 B1 | 10/2005 | Sekiguchi | |
| 7,823,199 B1 * | 10/2010 | Rathi | H04L 63/1408 370/338 |
| 8,065,712 B1 * | 11/2011 | Cheng | H04L 63/105 726/1 |
| 8,072,990 B1 * | 12/2011 | Tuvell et al. | 370/401 |
| 8,627,447 B1 | 1/2014 | Chickering | |
| 2002/0145506 A1 * | 10/2002 | Sato | 340/5.7 |
| 2002/0165023 A1 | 11/2002 | Brosnan et al. | |
| 2003/0070095 A1 * | 4/2003 | Okamoto et al. | 713/201 |
| 2003/0237018 A1 | 12/2003 | Baba | |
| 2004/0057443 A1 * | 3/2004 | Kim et al. | 370/401 |
| 2005/0238005 A1 * | 10/2005 | Chen | H04L 63/145 370/389 |

(Continued)

OTHER PUBLICATIONS

Chadwick, David, Alexander Otenko, and Edward Ball. "Role-based access control with X. 509 attribute certificates." IEEE Internet Computing 7.2 (2003): 62-69.*

(Continued)

*Primary Examiner* — Samson Lemma
*Assistant Examiner* — Michael Guirguis
(74) *Attorney, Agent, or Firm* — Harrity & Harrity, LLP

(57) ABSTRACT

A method may include obtaining a layer two identification of an endpoint that is seeking access to a network, the endpoint omitting an agent to communicate a layer three address of the endpoint to a policy node, applying one or more authentication rules based on the layer two identification of the endpoint, assigning the layer three address to the endpoint, learning, by the policy node, the layer three address of the endpoint, and provisioning layer three access for the endpoint to the network based on the learned layer three address.

20 Claims, 14 Drawing Sheets

(56) References Cited

U.S. PATENT DOCUMENTS

| | | |
|---|---|---|
| 2006/0075140 A1 | 4/2006 | Sobel et al. |
| 2006/0090208 A1* | 4/2006 | Smith .................. G06F 21/604 726/26 |
| 2006/0294257 A1 | 12/2006 | Kumano et al. |
| 2007/0198633 A1 | 8/2007 | Thibeault |
| 2007/0274290 A1* | 11/2007 | Takahashi ........... H04L 12/4625 370/351 |
| 2009/0129386 A1* | 5/2009 | Rune ................... H04L 12/2881 370/392 |

OTHER PUBLICATIONS

Cohen, "Service provisioning in an ATM-over-ADSL access network," Communications Magazine, IEEE 37.10 (1999), 82-87.

Microsoft@ Computer Dictionary, Fifth Edition, May 1, 2002, p. 337.

\* cited by examiner

444

| CONDITION 502 | ID 504 | ROLE 506 | VLAN 508 |
|---|---|---|---|
| USERNAME = 00.00.02 | 00:00:02 | PRINTER | DATA VLAN |
| USERNAME = 0004.0daa.2582 | 0004.0daa.2582 | IP PHONE | IP PHONE VLAN |
| USERNAME = SMITH | 0004.0e34.4344 | EMPLOYEE | GLOBAL VLAN |
| USERNAME = temperature232 | temperature232 | HEATING & COOLING SYSTEM | DATA VLAN |
| USERNAME = VISITOR | 0004.0c23.2568 | GUEST | GUEST VLAN |

| ROLE 542 | IP ADDRESSES 544 | NETWORK ADDRESS 546 |
|---|---|---|
| PRINTER | 192.168.1.0 – 192.168.1.49 | 123.134.0.0 |
| IP PHONE | 192.168.1.50 – 192.168.1.99 | 123.134.0.1 |
| EMPLOYEE | [*.*.*.*] | 146.100.5.6 |
| H&C SYSTEM | 192.168.1.100 – 192.168.1.149 | 123.134.0.2 |
| GUEST | 192.168.1.150 – 192.168.1.199 | 144.99.3.2 |

FIG. 5(b)

| SESSION ID 602 | 50e120 | 50E14a | 50e6bd | 50e819 | 50c341 |
|---|---|---|---|---|---|
| IP ADDRESS 604 | 123.134.0.0 | 123.134.0.1 | 146.100.5.6 | 123.134.0.2 | 144.99.3.2 |
| ROLE 606 | PRINTER | IP PHONE | EMPLOYEE, DOCS | HEATING & COOLING SYSTEM | GUEST |

| DESTINATION NETWORK ADDRESS 1102 | ROLE 1104 | ACTION 1106 |
|---|---|---|
| DOCS SERVER [192.168.1.1] | EMPLOYEE, PRINTER | PERMIT |
| VOIP SERVER [192.168.1.52] | EMPLOYEE, IP PHONE | PERMIT |
| HELP SERVER 192.154.1.123 | EMPLOYEE | PERMIT |
| H&C SERVER [192.168.1.101] | EMPLOYEE, H&C SYSTEM | PERMIT |
| GUEST SERVER [192.168.1.150] | EMPLOYEE, GUEST | PERMIT |

FIG. 11(a)

PROVISIONING LAYER THREE ACCESS FOR AGENTLESS DEVICES

RELATED APPLICATION

This application is a continuation of U.S. patent application Ser. No. 11/857,084, filed Sep. 18, 2007 (now U.S. Pat. No. 8,627,447), the disclosure of which is incorporated herein by reference.

BACKGROUND

Network providers (NPs) and enterprise IT departments may employ various authentication and authorization procedures to manage access to a network. Some endpoints, although known by the network providers and IT departments, may not include an agent that provides information to a policy node that manages access in the network. In these instances, while authentication and authorization of an endpoint may be performed, dynamically provisioning access for the endpoint in the network at layer three requires the policy server to learn the endpoint's IP address.

SUMMARY

According to one aspect, a method may include obtaining a layer two identification of an endpoint that is seeking access to a network, the endpoint may be omitting an agent to communicate a layer three address of the endpoint to a policy node, applying one or more authentication rules based on the layer two identification of the endpoint, assigning the layer three address to the endpoint, learning, by the policy node, the layer three address of the endpoint, and provisioning layer three access for the endpoint to the network based on the learned layer three address.

According to another aspect, a system to which an endpoint communicates may include logic to authenticate the endpoint for access in a network at a layer two, the endpoint may omit logic to communicate a layer three address to layer three policy logic, logic to assign the layer three address to the endpoint, logic to provide the layer three policy logic with the layer three address of the endpoint, and logic to enforce layer three access of the endpoint in the network based on the layer three address of the endpoint.

According to yet another aspect, a device may include a memory containing instructions and network policies, and a processor. The processor may execute the instructions to obtain a layer two identification of an endpoint, and authenticate the endpoint based on the layer two identification of the endpoint and one or more network policies. The processor may execute the instructions to learn a layer three address of the endpoint from an external device other than the endpoint, where the endpoint may not include logic to communicate the layer three address to the device, and control a layer three enforcement point by providing one or more of the network policies corresponding to the endpoint and the layer three address of the endpoint to the layer three enforcement point.

According to still another aspect, a device may include a memory containing instructions and layer three policies of a network, and a processor that executes the instructions to learn an assigned layer three address of an endpoint from an external device, where the endpoint is unable to transmit the assigned layer three address to the device, directly or indirectly. The processor may execute the instructions to provide the assigned layer three address of the endpoint to a layer three enforcement point.

According to yet another aspect, a device may include means for authenticating an endpoint based on a layer two identifier of the endpoint, means for learning a layer three address of the endpoint based on an external device, where the external device acquires the layer three address based on at least one of a scanning of the endpoint, an assigning of the layer three address to the endpoint, or an intercepting of a transmission from the endpoint, means for determining layer three policies corresponding to the endpoint based on an association of the layer three address of the endpoint and the layer two identifier of the endpoint, and means for enforcing layer three access of the endpoint by providing a layer three enforcement point with the determined layer three policies and the layer three address of the endpoint.

BRIEF DESCRIPTION OF THE DRAWINGS

The accompanying drawings, which are incorporated in and constitute a part of this specification, illustrate one or more embodiments described herein and, together with the description, explain aspects of the invention. In the drawings:

FIGS. 5(a) and 5(b) are diagrams illustrating the exemplary layer two mapping table and the exemplary layer three mapping table depicted in FIG. 4;

FIG. 6 is a diagram illustrating the exemplary current session table depicted in FIG. 4;

FIGS. 11(a) and 11(b) are diagrams illustrating the exemplary layer three policy table and the exemplary address/role table depicted in FIG. 10;

DETAILED DESCRIPTION OF PREFERRED EMBODIMENTS

The following detailed description refers to the accompanying drawings. The same reference numbers in different drawings may identify the same or similar elements. In addition, while some of the following description may be provided in network elements at layer two and/or layer three of, for example, the Open Systems Interconnection (OSI) Model, the principles and teachings may be applied to different network elements and/or at different layers of a protocol stack that operate with analogous functionality. The term device, network element, and component as used herein, are to be broadly interpreted to include any logic, such as hardware, software, and/or a combination of hardware and software to provide for the functionality as described herein.

Figure 1:
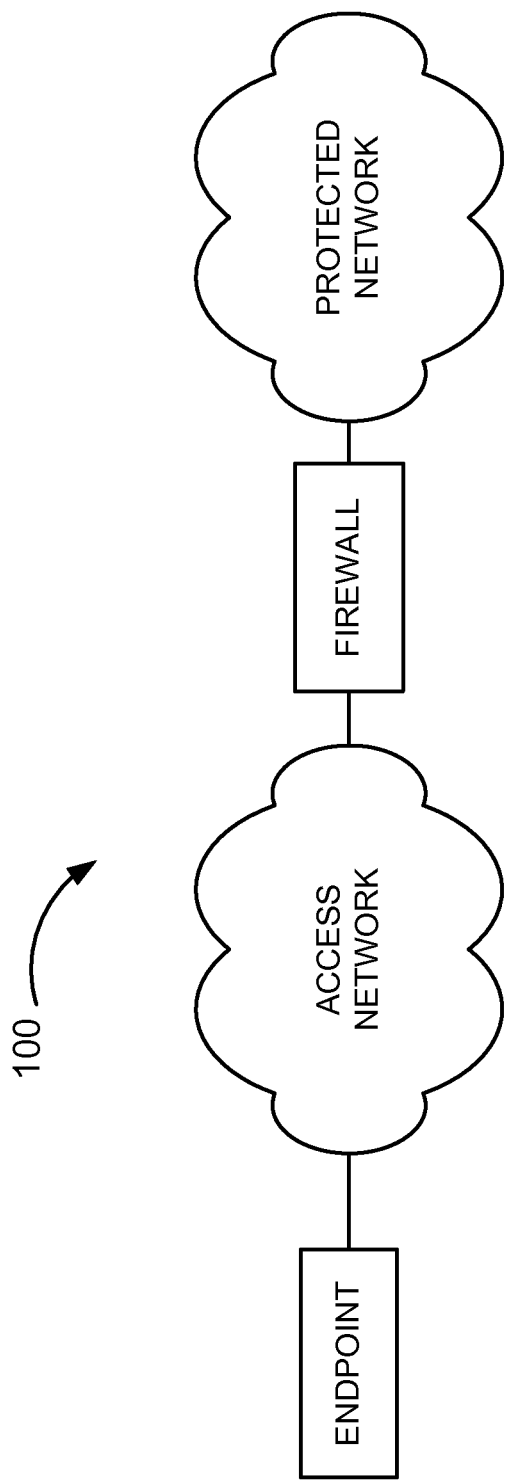
FIG. 1 is a diagram illustrating a concept described herein.

FIG. 1 is a diagram illustrating a concept described herein. As illustrated in concept 100, an endpoint (e.g., an Internet Protocol (IP) phone) may communicate with a network element, such as a network access node, residing in the access network. Employing any number of techniques, authentication and authorization may be granted to the endpoint via a network element, such as a policy server, residing in the access network.

The endpoint may be issued an IP address by a network element, such as a dynamic host configuration protocol (DHCP) server, residing in the access network. However, the endpoint may be unable to provide a network element, such as the policy server, with the IP address because the endpoint does not include, for example, an agent. Nevertheless, the endpoint may wish to gain access to a protected resource, such as a protected network, via a layer three enforcement point, such as a firewall. However, since the policy server is unaware of the IP address of the endpoint because the endpoint does not include the agent, the policy server may not be able to appropriately provision the endpoint's access to the protected network via the firewall.

In such an instance, the ability to provision access through the firewall based on the characteristics of the endpoint may be beneficial. Employing any number of techniques, the policy server may learn the IP address issued to the endpoint from other network elements. Based on this information, the policy server may provision layer three access via the firewall for the endpoint. That is, the firewall may grant access to the endpoint to all or a portion of the protected network. For example, the firewall may grant the endpoint layer three access to various voice-over IP (VOIP) servers in the protected network but prohibit network access to all other nodes in the protected network.

As a result of the foregoing, network providers and administrators are provided with a platform that provides enhanced layer three access control for endpoints that may not include an agent that can communicate IP address information to the policy server.

Exemplary Environment

Figure 2:
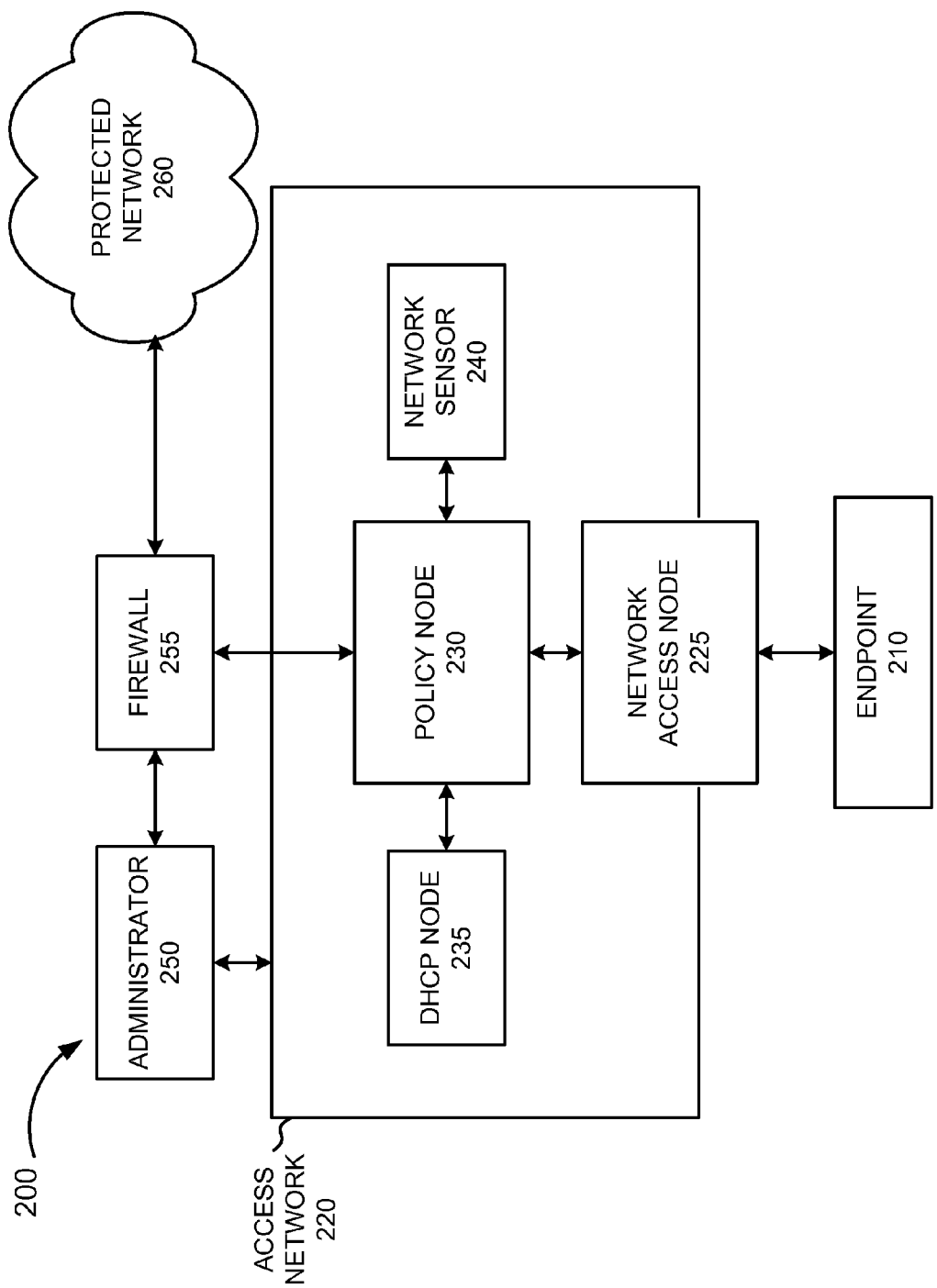
FIG. 2 is a diagram illustrating an exemplary environment in which concepts described herein may be implemented.

FIG. 2 is a diagram illustrating an exemplary environment in which concepts described herein may be implemented. As illustrated, environment 200 may include an endpoint 210, an access network 220, an administrator 250, a firewall 255, and a protected network 260. Access network 220 may include a network access node 225, a policy node 230, a dynamic host configuration protocol (DHCP) node 225, and a network sensor 240. The connections of environment 200 may be, for example, wired or wireless. Further, the connections between and/or among the exemplary components depicted in FIG. 2 may be direct or indirect.

Endpoint 210 may include, for example, a device that does not support an agent that can communicate its IP address to policy node 230, but is recognized by access network 220 and/or administrator 250. For example, devices, such as printers, fax machines, photocopiers, heating and cooling systems, card readers, specialized appliances, IP cameras, IP phones, etc., may not be capable of running the agent software that communicates with policy node 230, but are capable of communicating with network access node 225 and other nodes in environment 200.

Access network 220 may include a local area network (LAN), a wide-area network (WAN), the Internet, a telephone network (e.g., a Public Switched Telephone Network (PSTN)), an intranet, a private corporation network, a wireless network, etc., or a combination of networks. Access network 220 may provide services, such as applications and/or content, to an endpoint, such as endpoint 210.

Network access node 225 may include any device to control an endpoint's ability to access a network, such as access network 220. For example, network access node 225 may permit, deny, or redirect traffic, and provide dynamic network access and policy enforcement. Network access node 225 may include an access point, such as a wireless access point (WAP). Additionally, or alternatively, network access node 225 may include a network switch and/or a network router. In another implementation, network access node 225 may include a network firewall or proxy (e.g., a gateway).

Network access node 225 may employ, for example, an 802.1X-based standard framework to provide authentication, access control, and data privacy. Network access node 225 may be an inline network access enforcement point and may be distributed throughout environment 200. In other implementations, network access node 225 may be an out-of-band network access control point. As will be described below, environment 200 may employ authentication and authorization procedures to permit endpoint 210 network access via network access node 225.

Policy node 230 may include any device that decides whether to permit an endpoint, such as endpoint 210, access to network resources, such as access network 220 and/or protected network 260, based on access and security policies. In one implementation, policy node 230 may be a server and may operate to employ authentication and authorization procedures. For example, policy node 230 may include a Remote Authentication Dial-In User Service (RADIUS) server. Policy node 230 may service requests, such as authentication and authorization requests, from network access node 225.

DHCP node 235 may include any device that assigns an IP address and/or other configuration parameters (e.g., Transport Control Protocol (TCP)/IP stack configuration parameters, such as subnet mask and default parameters) to an endpoint, such as endpoint 210. In one implementation, DHCP node 235 may be a server that allocates IP addresses based on MAC addresses. Additionally, or alternatively, DHCP node 235 may allocate IP addresses based on a character string, such as an endpoint ID. DHCP 235 may provide for dynamic, automatic, and/or manual IP address allocation, and may support a mix of static and dynamic IP addresses, as well as private and public IP addresses. DHCP 235 may set a length of time (i.e., a lease) for which a provided IP address is valid. The lease time may vary depending on how long an Internet connection is likely to be needed.

Network sensor 240 may include any device to detect information about an endpoint, such as endpoint 210. For example, network sensor 240 may include scanning and detection features to elicit address information and other characteristics associated with an endpoint.

Administrator 250 may include any device via which a person can maintain and/or monitor various nodes of environment 200. For example, administrator 250 may provide for configuration of authentication and authorization policies, network address assignment, assignment of routing protocols, and/or other types of support services. Administrator 250 may utilize one or more devices to maintain and/or monitor environment 200.

Firewall 255 may include any device that blocks or allows network traffic to pass from, for example, access network 220 to protected network 260. Firewall 255 may block or allow traffic, for example, based on source address, destination address, source port, destination port, protocol, etc.

Protected network 260 may include a LAN, a WAN, the Internet, a telephone network (e.g., a PSTN), an intranet, a private corporation network, a wireless network, etc., or a combination of networks. Protected network 260 may provide resources, such as applications and/or content, to an endpoint, such as endpoint 210.

Although FIG. 2 illustrates exemplary components of environment 200, in other implementations fewer, additional, or different components may be utilized. For example, one or more nodes in environment 200 may be combined into a single device and/or distributed into a plurality of devices. Additionally, or alternatively, one or more nodes in environment 200 may be remotely located. Additionally, or alternatively, access network 220 may include web servers, file servers, etc. that provide various resources to endpoint 210.

Network Access Node

Figure 3:
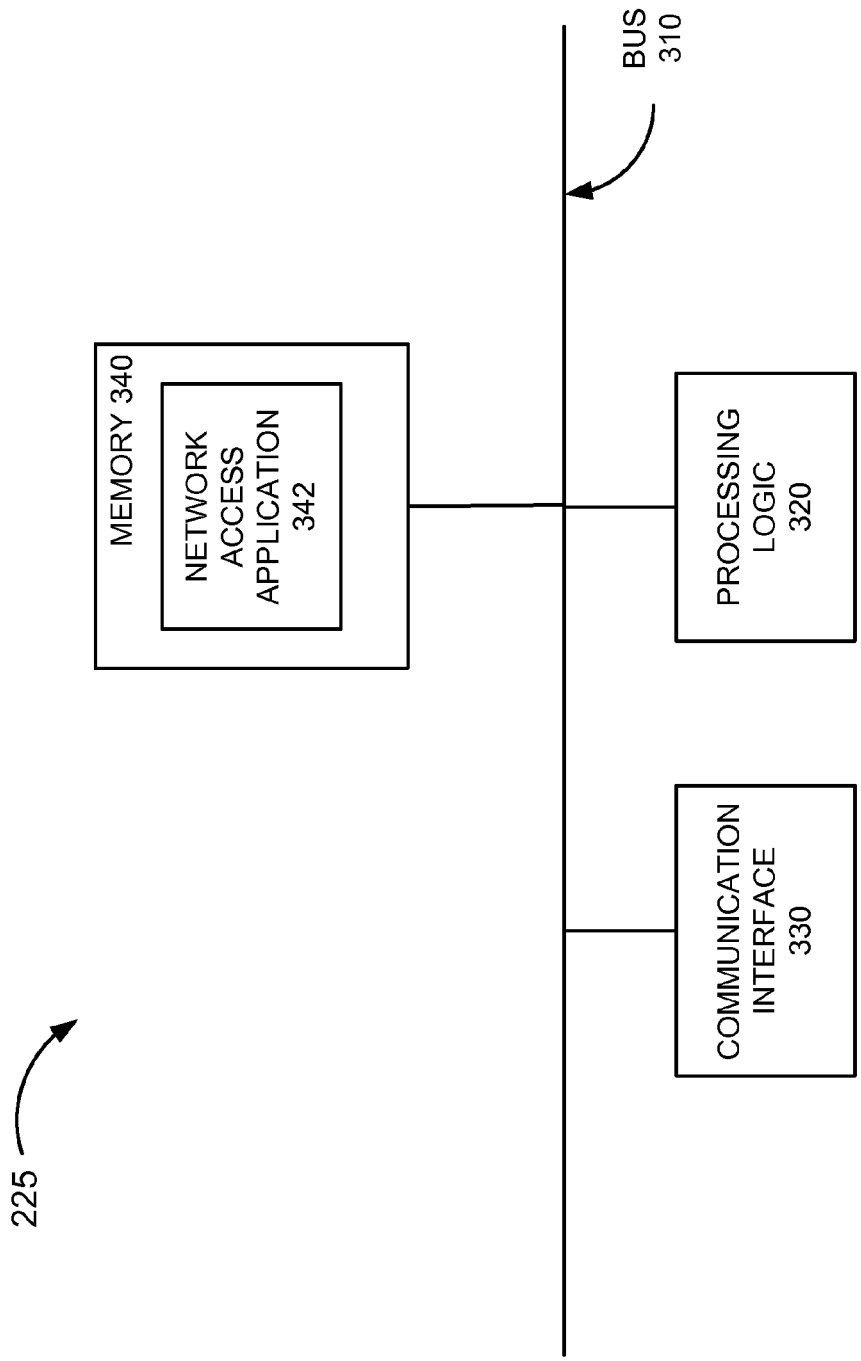
FIG. 3 is a diagram illustrating exemplary components of the network access node depicted in FIG. 2.

FIG. 3 is a diagram illustrating exemplary components of the network access node depicted in FIG. 2. As illustrated, network access node 225 may include a bus 310, processing logic 320, a communication interface 330, and a memory 340.

Bus 310 may include a communication link that permits communication among the components of network access node 225. Processing logic 320 may include any type of processor or microprocessor that interprets and executes instructions. In other implementations, processing logic may include an application specific integrated circuit (ASIC), field programmable gate array (FPGA), etc.

Communication interface 330 may include any transceiver-like mechanism that enables network access node 225 to communicate with other devices and/or systems. Communication interface 330 may allow for wired or wireless communication. In one implementation, communication interface 330 may allow for network access node 225 to be controlled and/or administered remotely by an operator, such as administrator 250.

Memory 340 may include a random access memory (RAM) or another type of dynamic storage device that may store information and instructions for execution by processing logic 320; a read only memory (ROM) device or another type of static storage device that may store static information and instructions for use by processing logic 320; and/or some other type of storing component, such as a magnetic or optical recording medium and its corresponding drive for storing information and/or instructions.

Memory 340 may store network access application 342. Network access application 342 may include instructions for causing network access node 225 to implement an authentication and/or an authorization protocol to establish sessions between a node, such as endpoint 210 and/or a node of access network 220. For example, the authentication and/or authorization procedures may be based on the 802.1X framework, Remote Authentication Dial-In User Service (RADIUS) and/or Extensible Authentication Protocol (EAP).

Network access node 225 may perform certain operations, as described below. Network access node 225 may perform these operations in response to processing logic 320 executing software instructions contained in a computer-readable medium, such as memory 340. A computer-readable medium may be defined as a physical or logical memory device and/or carrier wave. The software instructions may be read into memory 340 from another computer-readable medium or from another device via communication interface 330. The software instructions contained in memory 340 may cause processing logic 320 to perform processes as described below.

Since the components of network access node 225 depicted in FIG. 3 are exemplary in nature, it is to be understood that network access node 225 may include fewer, additional or different components that aid in receiving, transmitting, and/or processing data. Further, other configurations of components of network access node 225 are possible.

Policy Node

Figure 4:
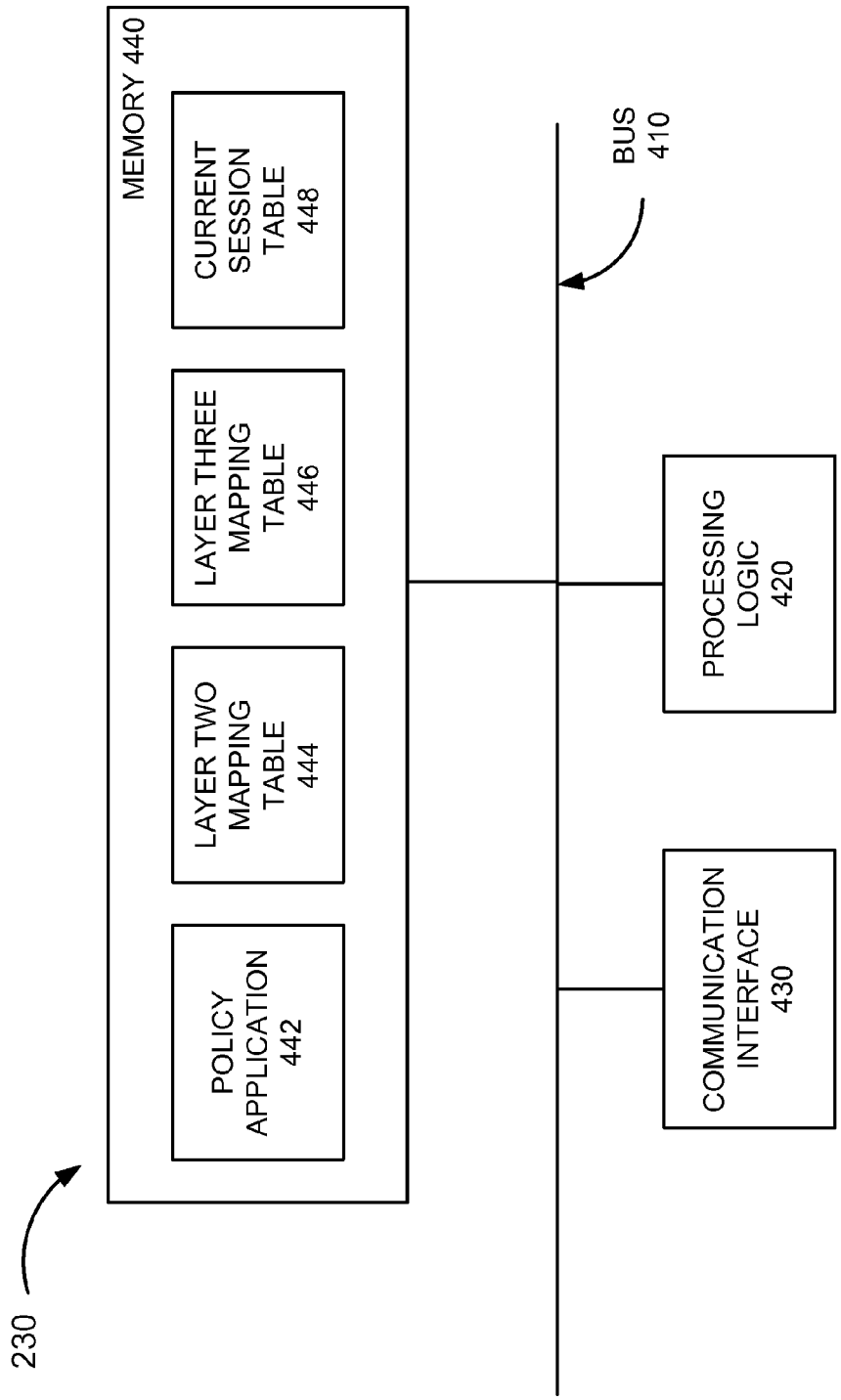
FIG. 4 is a diagram illustrating exemplary components of the policy node depicted in FIG. 2.

FIG. 4 is a diagram illustrating exemplary components of the policy node depicted in FIG. 2. As illustrated, policy node 230 may include a bus 410, processing logic 420, a communication interface 430, and a memory 440.

Bus 410 may include a communication link that permits communication among the components of policy node 230. Processing logic 420 may include any type of processor or microprocessor that interprets and executes instructions. In other implementations, processing logic 420 may include an ASIC, FPGA, etc.

Communication interface 430 may include any transceiver-like mechanism that enables policy node 230 to communicate with other devices and/or systems. In one implementation, communication interface 430 may allow for policy node 230 to be controlled and/or administered remotely by an operator, such as administrator 250.

Memory 440 may include a RAM or another type of dynamic storage device that may store information and instructions for execution by processing logic 420; a ROM device or another type of static storage device that may store static information and instructions for use by processing logic 420; and/or some other type of storing component, such as a magnetic or optical recording medium and its corresponding drive for storing information and/or instructions.

Memory 440 may store a policy application 442, a layer two mapping table 444, a layer three mapping table 446, and a current session table 448. Policy application 442 may allow policy node 230 to implement an authentication and/or authorization protocol, such as RADIUS and/or EAP, to establish sessions between nodes, such as endpoint 210 and access network 220, and other related processes associated with network access (e.g., traffic monitoring, etc.).

Layer two mapping table 444 may define, for example, the layer two resources afforded to different roles. Layer three mapping table 446 may define, for example, the layer three resources afforded to different roles. Current session table 448 may store information related to sessions.

Policy node 230 may perform certain operations, as described below. Policy node 230 may perform these operations in response to processing logic 420 executing software instructions contained in a computer-readable medium, such as memory 440. The software instructions may be read into memory 440 from another computer-readable medium or from another device via communication interface 430. The software instructions contained in memory 440 may cause processing logic 420 to perform processes that are described below.

Since the components of policy node 230 depicted in FIG. 4 are exemplary in nature, it is to be understood that policy node 230 may include fewer, additional or different components that aid in receiving, transmitting, and/or processing data. Further, other configurations of components of policy node 230 are possible.

FIGS. 5(a) and 5(b) are diagrams illustrating the exemplary layer two mapping table and the exemplary layer three mapping table depicted in FIG. 4. Layer two mapping table 444 may include a condition field 502, an ID field 504, a role field 506, and a virtual local-area network (VLAN) field 508. Condition field 502 may include conditions for determining whether an endpoint should be accorded a role in role field 506. For example, authentication information (i.e., username=) may be employed as a condition. Other conditions may be employed as well, for example, condition field 502 may include a condition of HEALTHY to indicate that endpoint 210 includes current anti-virus software and/or is virus-free.

ID field 504 may include a unique identifier of an endpoint, such as endpoint 210. For example, in one implementation, ID field 504 may include a MAC address (e.g., record 522, record 524, or record 528). Additionally, or alternatively, ID field 504 may include a portion (e.g., three bytes) of a MAC address (e.g., MAC-48). The three bytes of the MAC address may identify a vendor of endpoint 210 based on its numeric value (e.g., record 520). For example, the three bytes of the MAC address in ID field 504 of record 520 may identify a vendor that makes printers. Additionally, or alternatively, ID field 504 may include a character string (e.g., temperature 232) that corresponds to an ID of endpoint 210 (e.g., record 526). In some instances, administrator 250 may manually enter MAC address and/or character string information in ID field 504. In other instances, network sensor 240 may acquire MAC address/character string information and/or other information that characterizes endpoint 210 and provide this information to policy node 230.

Role field 506 may define allowed roles, such as permissions granted to an endpoint when the condition in condition field 502 is satisfied. VLAN field 544 may indicate the layer two resources (e.g., VLANs) that endpoint 210 with the corresponding role defined in role field 542 may access.

As illustrated in FIG. 5(a), layer two mapping table 444 may include five records, such as records 520 through 528. Endpoint 210 may be a device, such as a printer, an IP phone, or a heating & cooling system that does not include an 802.1X supplicant. In other instances, endpoint 210 may be a device, such as a computer, that does include an 802.1X supplicant.

When all the conditions in condition field 502 are satisfied, the corresponding roles defined in role field 506 may be accorded to endpoint 210. Based on the roles defined in role field 506, layer two mapping table 444 may provide layer two access to endpoint 210 in correspondence to VLAN information contained in VLAN field 508.

As illustrated in FIG. 5(b), layer three mapping table 446 may include a role field 542, and an IP addresses field 544, and a network address field 546. Role field 542 may correspond to role field 506. IP addresses field 544 may contain a range of accessible IP addresses that endpoint 210 may be allowed to access based on the role defined in role field 542. Network address field 546 may contain a layer three address of endpoint 210.

Layer three mapping table 446 may include five records, such as records 560 through 568. The roles defined in role field 542, such as PRINTER, IP PHONE, EMPLOYEE, Heating & Cooling (H&C) SYSTEM, and GUEST may be assigned corresponding access to layer three resources as defined in IP addresses field 544.

FIG. 6 is a diagram illustrating the exemplary current session table depicted in FIG. 4. Current session table 448 may include a session ID field 602, an IP address field 604, and a role field 606.

Current session table 448 may include five sessions, such as sessions 620 through 628. Session ID field 602 may include a unique identifier for a session. For example, session ID field may include a character string (e.g., a hexadecimal string). IP address field 604 may include a layer three address, such as an IP address, associated with endpoint 210. Role field 606 may contain analogous information to role fields 506 and 542.

DHCP Node

Figure 7:
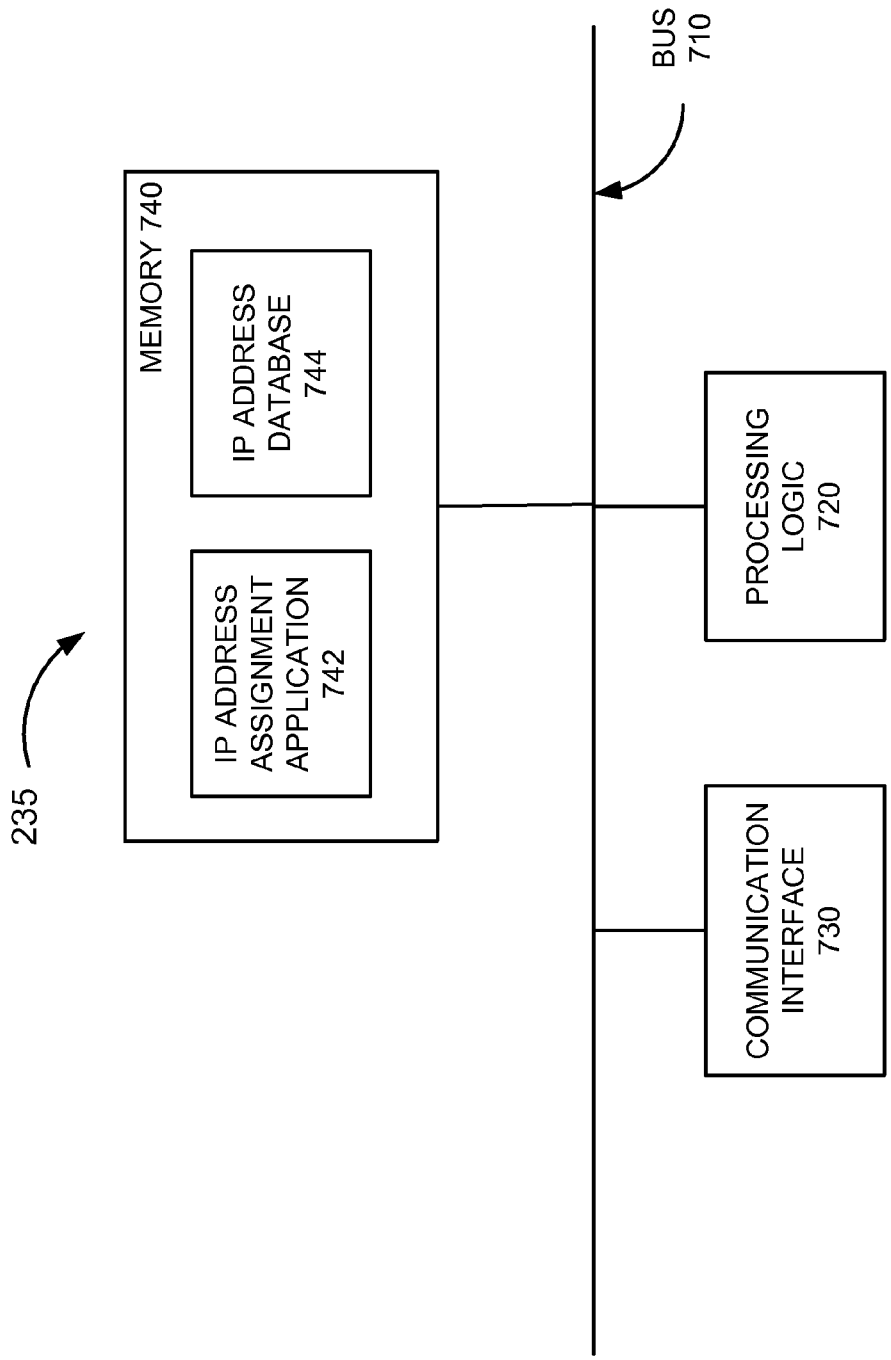
FIG. 7 is a diagram illustrating exemplary components of the DHCP node depicted in FIG. 2.

FIG. 7 is a diagram illustrating exemplary components of the DHCP node depicted in FIG. 2. As illustrated, DHCP node 235 may include a bus 710, processing logic 720, a communication interface 730, and a memory 740.

Bus 710 may include a communication link that permits communication among the components of DHCP node 235. Processing logic 720 may include any type of processor or microprocessor that interprets and executes instructions. In other implementations, processing logic 720 may include an ASIC, FPGA, etc.

Communication interface 730 may include any transceiver-like mechanism that enables DHCP node 235 to communicate with other devices and/or systems. In one implementation, communication interface 730 may allow for DHCP node 235 to be controlled and/or administered remotely by an operator, such as administrator 250.

Memory 740 may include a RAM or another type of dynamic storage device that may store information and instructions for execution by processing logic 720; a ROM device or another type of static storage device that may store static information and instructions for use by processing logic 720; and/or some other type of storing component, such as a magnetic or optical recording medium and its corresponding drive for storing information and/or instructions.

Memory 740 may store an IP address assignment application 742 and an IP address database 744. IP address assignment application 742 may include instructions for causing DHCP node 235 to perform various operations associated with IP address management and assignment. IP address assignment application 742 may assign an IP address from a pool of IP addresses maintained in IP address database 744.

DHCP node 235 may perform certain operations, as described below. DHCP node 235 may perform these operations in response to processing logic 720 executing software instructions contained in a computer-readable medium, such as memory 740. The software instructions may be read into memory 740 from another computer-readable medium or from another device via communication interface 730. The software instructions contained in memory 740 may cause processing logic 720 to perform processes that are described below.

Since the components of DHCP node 235 depicted in FIG. 7 are exemplary in nature, it is to be understood that DHCP node 235 may include fewer, additional or different components that aid in receiving, transmitting, and/or processing data. Further, other configurations of components of DHCP node 235 are possible.

Figure 8:
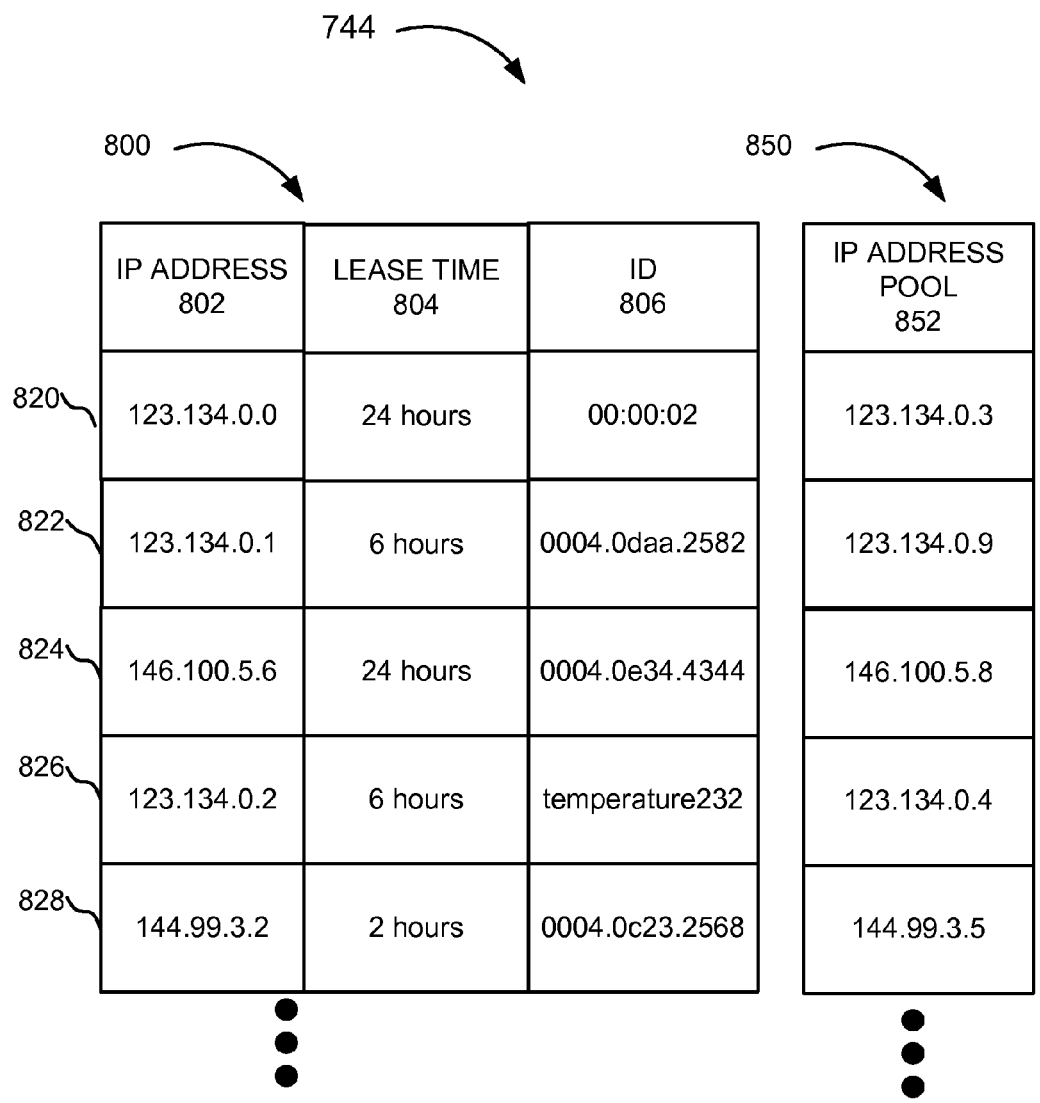
FIG. 8 is a diagram illustrating the exemplary IP address database depicted in FIG. 7.

FIG. 8 is a diagram illustrating the exemplary IP address database depicted in FIG. 7. IP address database 744 may include an IP address table 800 and an IP address pool 850.

IP address table 800 may include an IP address field 802, a lease time field 804, and an ID field 806. IP address field 802 may contain IP addresses that were issued, and lease time field 804 may indicate the life expectancy of the IP addresses. ID field 806 may contain an identifier of the endpoint, such as endpoint 210. As previously described herein, an identifier of endpoint 210 may include a MAC address or some other character string. IP address pool 850 may include IP address pool field 852. IP address pool field 852 may include 32-bit IP addresses (IPv4), 128-bit IP addresses (IPv6), private IP addresses, and/or public IP addresses. DHCP node 235 may issue IP addresses from IP address pool field 852 of IP address pool 850.

Network Sensor

Figure 9:
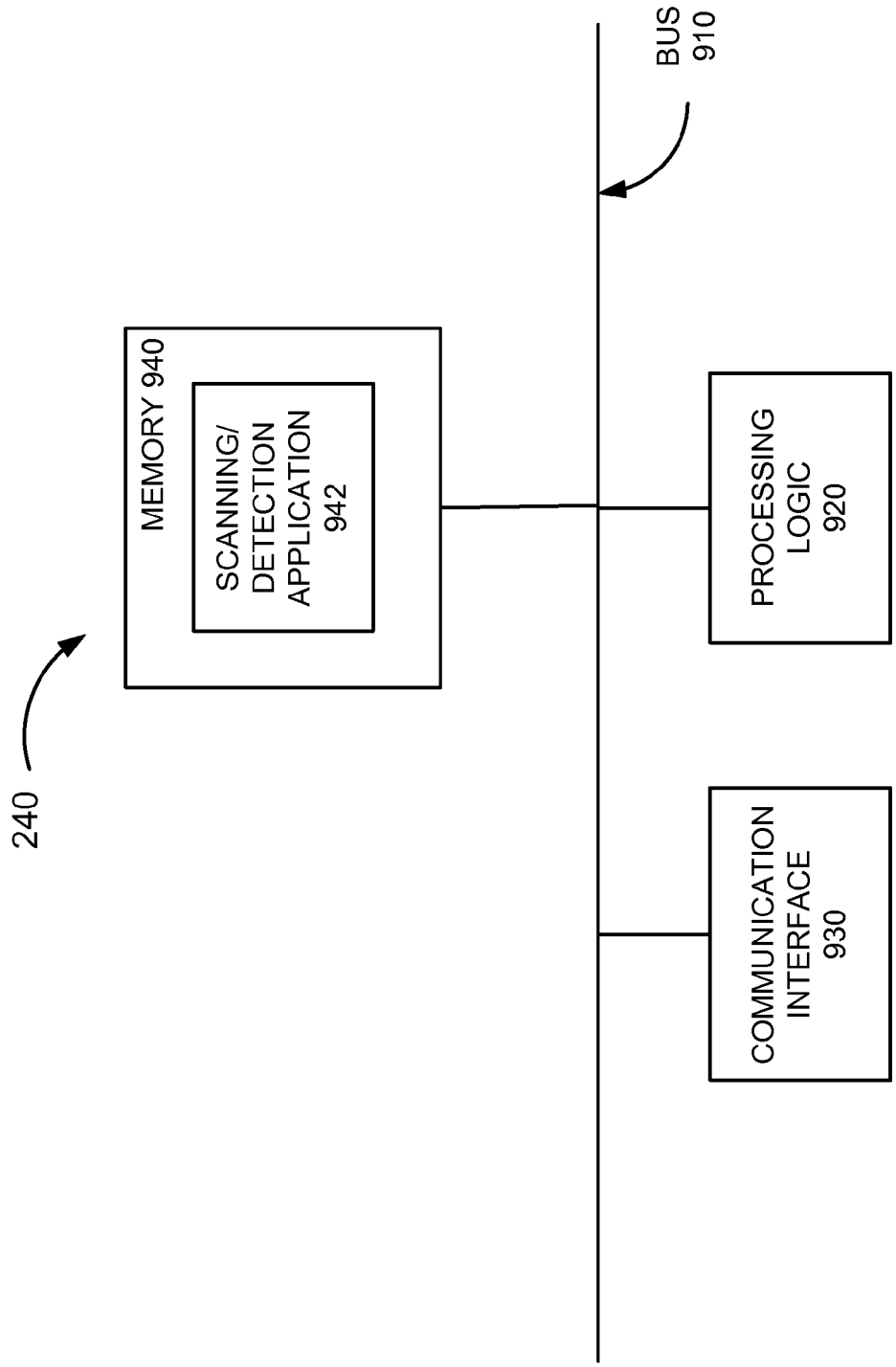
FIG. 9 is a diagram illustrating exemplary components of the network sensor depicted in FIG. 2.

FIG. 9 is a diagram illustrating exemplary components of the network sensor depicted in FIG. 2. As illustrated, network sensor 240 may include a bus 910, processing logic 920, a communication interface 930, and a memory 940.

Bus 910 may include a communication link that permits communication among the components of network sensor 240. Processing logic 920 may include any type of processor or microprocessor that interprets and executes instructions. In other implementations, processing logic 920 may include an ASIC, FPGA, etc.

Communication interface 930 may include any transceiver-like mechanism that enables network sensor 240 to communicate with other devices and/or systems. In one implementation, communication interface 930 may allow for network sensor 240 to be controlled and/or administered remotely by an operator, such as administrator 250.

Memory 940 may include a RAM or another type of dynamic storage device that may store information and instructions for execution by processing logic 920; a ROM device or another type of static storage device that may store static information and instructions for use by processing logic 920; and/or some other type of storing component, such as a magnetic or optical recording medium and its corresponding drive for storing information and/or instructions.

Memory 940 may store a scanning/detection application 942. Scanning/detection application 942 may include instructions for causing network sensor 240 to scan endpoints, such as endpoint 210, and perform various detection operations, such as packet sniffing, vulnerability assessments (e.g., virus assessments), policy validations, and/or other types of network discovery operations (e.g., determining the type of device, etc.). Scanning/detection application 942 may perform these operations in a reactive and/or proactive manner. The information retrieved may be stored and/or shared with other devices in access network 220, such as policy node 230 or administrator 250.

Network sensor 240 may perform certain operations, as described below. Network sensor 240 may perform these operations in response to processing logic 920 executing software instructions contained in a computer-readable medium, such as memory 940. The software instructions may be read into memory 940 from another computer-readable medium or from another device via communication interface 930. The software instructions contained in memory 940 may cause processing logic 920 to perform processes that are described below.

Since the components of network sensor 240 depicted in FIG. 9 are exemplary in nature, it is to be understood that network sensor 240 may include fewer, additional or different components that aid in receiving, transmitting, and/or processing data. Further, other configurations of components of network sensor 240 are possible.

Firewall

Figure 10:
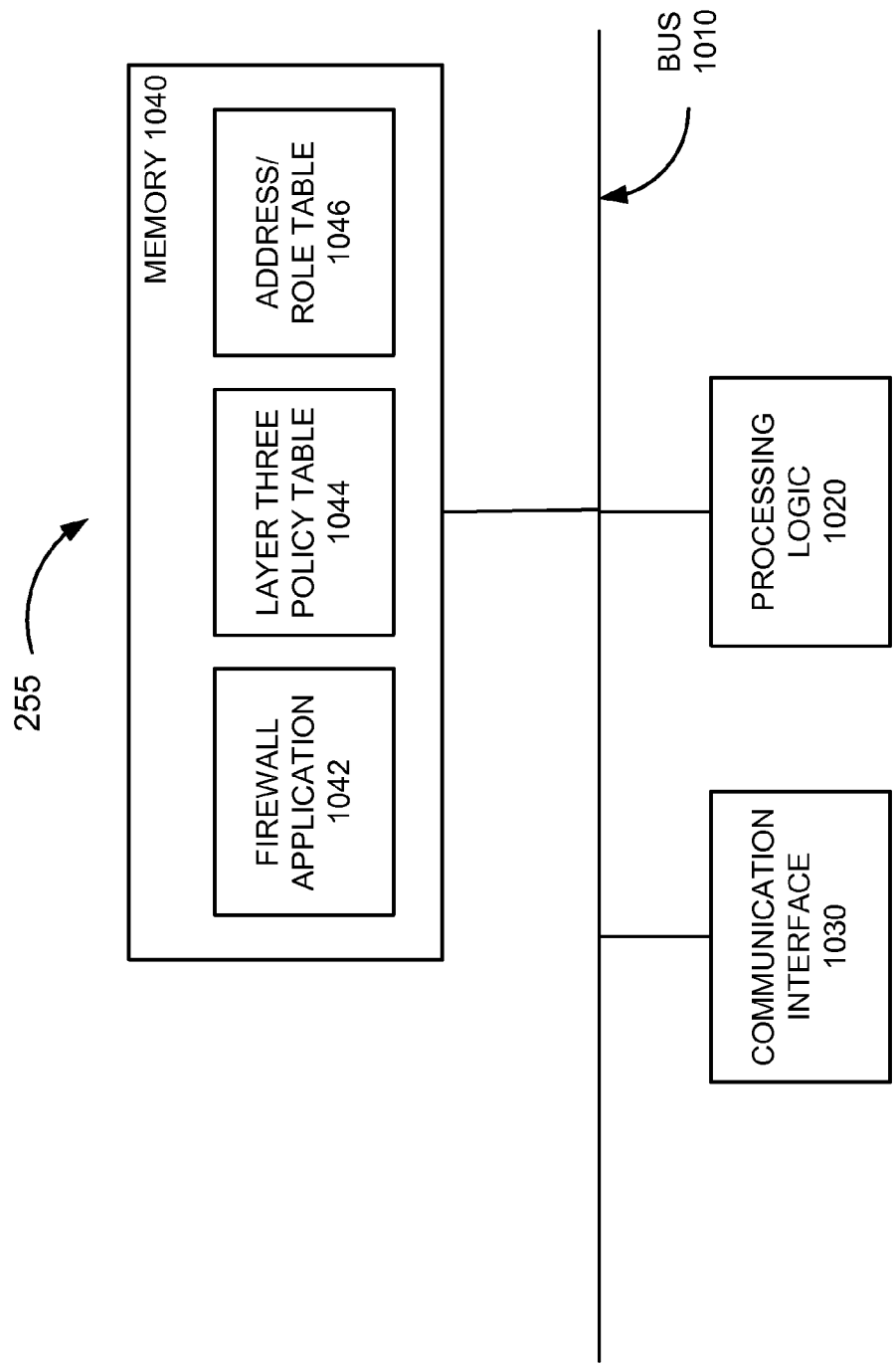
FIG. 10 is a diagram illustrating the exemplary firewall depicted in FIG. 2.

FIG. 10 is a diagram illustrating the exemplary firewall depicted in FIG. 2. As illustrated, firewall 255 may include a bus 1010, processing logic 1020, a communication interface 1030, and a memory 1040.

Bus 1010 may include a communication link that permits communication among the components of firewall 255. Processing logic 1020 may include any type of processor or microprocessor that interprets and executes instructions. In other implementations, processing logic 1020 may include an ASIC, FPGA, etc.

Communication interface 1030 may include any transceiver-like mechanism that enables firewall 1030 to communicate with other devices and/or systems. In one implementation, communication interface 1030 may allow for firewall 255 to be controlled and/or administered remotely by an operator, such as administrator 250.

Memory 1040 may include a RAM or another type of dynamic storage device that may store information and instructions for execution by processing logic 1020; a ROM device or another type of static storage device that may store static information and instructions for use by processing logic 1020; and/or some other type of storing component, such as a magnetic or optical recording medium and its corresponding drive for storing information and/or instructions.

Memory 1040 may store a firewall application 1042, a layer three policy table 1044, and an address/role table 1046. Firewall application 1042 may include instructions for causing firewall 255 to determine, among other things, when to forward or drop network traffic. Layer three policy table 1044 may include conditions for forwarding or dropping network traffic. Address/role table 1046 may indicate the roles and a range of network addresses available to endpoints.

Firewall 255 may perform certain operations, as described below. Firewall 255 may perform these operations in response to processing logic 1020 executing software instructions contained in a computer-readable medium, such as memory 1040. The software instructions may be read into memory 1040 from another computer-readable medium or from another device via communication interface 1030. The software instructions contained in memory 1040 may cause processing logic 1020 to perform processes that are described below.

Since the components of firewall 255 depicted in FIG. 10 are exemplary in nature, it is to be understood that firewall 255 may include fewer, additional or different components that aid in receiving, transmitting, and/or processing data. Further, other configurations of components of firewall 255 are possible.

Figure 11B:
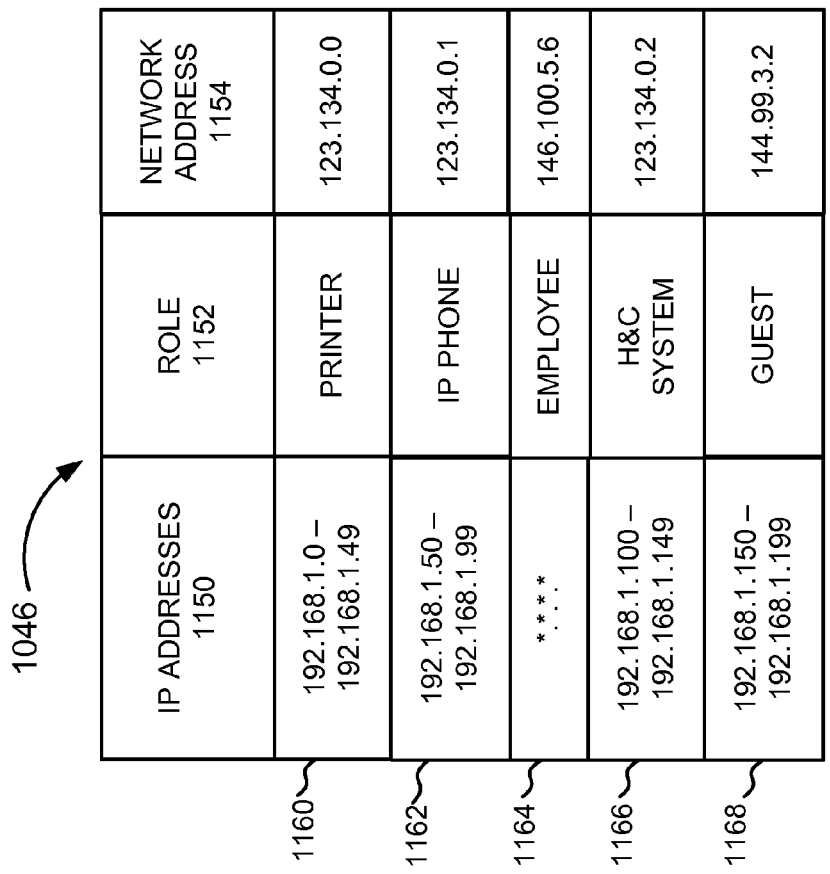

FIGS. 11(a) and 11(b) are diagrams illustrating the exemplary layer three policy table and the exemplary address/role table depicted in FIG. 10. Layer three policy table 1044 and address/role table 1046 may permit firewall 255 to provide layer three enforcement to protected network 260.

Layer three policy table 1044 may include a destination network address field 1102, a role field 1104, and an action field 1106. Destination network address field 1102 may include the network addresses (e.g., IP addresses) of resources in protected network 260. Role field 1104 may include the role that may be allowed to access or not access the corresponding network address in destination network address field 1102. Action field 1106 may include the action that firewall 255 may take when receiving network traffic destined to the corresponding network address in destination network address field 1102 from an endpoint 210 having the corresponding role in role field 1104. Layer three policy table 1044 may include five records, such as records 1120 through 1128.

Address/role table 1046 may include an IP addresses field 1150, a role field 1152, and a network address field 1154. IP addresses field 1150 may include a range of network address (e.g., IP addresses) that may be accessed by endpoint 210 in accordance to policy node 230. Role field 1152 may include the role that policy node 230 has accorded the corresponding network address in source network address field 1150. Network address field 1154 may contain the IP address of endpoint 210. Address/role table 1046 may include five records, such as records 1160 through 1168.

Exemplary Processing

Figure 12:
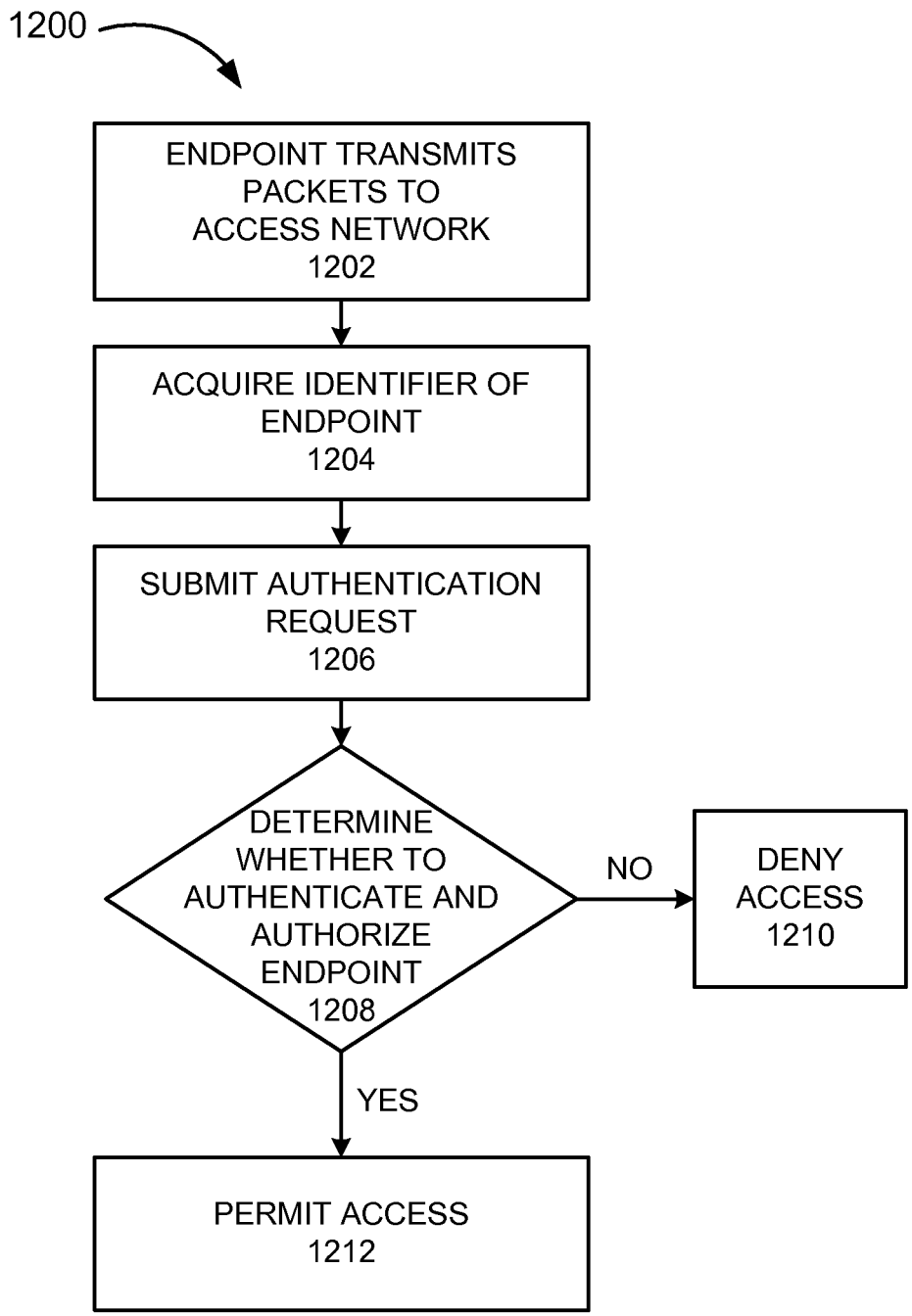
FIG. 12 is a flow chart of an exemplary process for authentication and authorization for the endpoint depicted in FIG. 2.

FIG. 12 is a flow chart of an exemplary process for authentication and authorization for the endpoint depicted in FIG. 2. Exemplary process 1200 is described below in relation to exemplary environment 200. Environment 200 may support an endpoint with an 802.1X supplicant or an endpoint that does not include an 802.1X supplicant. For purposes of discussion, descriptions of 802.1X challenges and timeouts have been omitted. In addition, descriptions of virus scanning, remediation, and other related processes that may be employed have been omitted.

Process 1200 may begin with endpoint 210 transmitting packets to access network 220 (Block 1202). For example, endpoint 210 may attempt to transmit packets to DHCP node 235 via network access node 225.

Access network 220 may acquire an identifier of endpoint 210 (Block 1204). In one implementation, endpoint 210 may include, for example, an 802.1X supplicant. Based on the 802.1X framework, information contained in condition field 502 and/or ID field 504 may be compared and/or updated.

In another implementation, endpoint 210 may not include an 802.1X supplicant. In this instance, network access node 225 may acquire an identifier of endpoint 210 based on the transmitted packets from endpoint 210. For example, network access application 342 of network access node 225 may read packets for MAC address information when a new endpoint attempts to gain access to access network 220. Additionally, or alternatively, network sensor 240 may acquire the MAC address of endpoint 210 based on the transmitted packets from endpoint 210 and/or scanning of endpoint 210. For example, scanning/detection application 942 may read packets for MAC address information when a new endpoint attempts to gain access to access network 220 and/or may scan endpoint 210 to acquire the MAC address of endpoint 210 and/or other types of information that characterizes endpoint 210. In one implementation, network sensor 240 may communicate the MAC address of endpoint 210, the type of device, or other characteristics of endpoint 2001 to network access node 225. In other instances, an identifier of endpoint 210 may be a character string that identifies endpoint 210.

Access network 220 may submit an authentication request (Block 1206). In one implementation, network access node 225 may use, for example, the RADIUS protocol to communicate with policy node 230. For example, network access node 225 may transmit a RADIUS-request message with the MAC address (or a portion of the MAC address) of endpoint 210 as a username to policy node 230. In other instances, network access node 225 may transmit a RADIUS-request message with a character string identifying endpoint 210 to policy node 230.

Access network 220 may determine whether to authenticate and authorize endpoint 210 (Block 1208). In one implementation, policy node 230 may refer to layer two mapping table 444. For example, policy application 442 may reference layer two mapping table 444, such as ID field 504, to determine whether a received MAC address, portion of a MAC, and/or a character string associated with RADIUS-request message from network access node 225 matches the information in condition field 502.

If the information of the RADIUS-request message does not match the information in condition field 502, then access is denied (Block 1210). For example, policy node 230 may send a RADIUS-reject message to network access node 225 indicating that access is denied. However, if the information of the RADIUS-request message matches the information in condition field 502, policy application 442 may accord the corresponding role, as indicated in role field 506, to endpoint 210. Based on the role defined in role field 506, policy node 230 may determine the type and/or extent of access endpoint 210 has with access network 220. For example, when endpoint 210 is accorded a role of IP PHONE (record 522 of layer two mapping table 444), policy node 230 may authorize access to IP PHONE VLAN in accordance with VLAN field 508.

Policy node 230 may create a record in current session table 448 (e.g., record 622). During the creation of the record 622, a session ID contained in session ID field 602 may be generated. Additionally, role field 606 of current session table 448 may be updated.

Policy node 230 may permit access (Block 1212). For example, policy node 230 may respond to network access node 225 with a RADIUS-accept message. For example, policy node 230 may provide information to network access node 225 regarding the type and/or extent of access endpoint 210 may have with access network 220.

Although FIG. 12 illustrates exemplary processes, in other implementations, different, fewer, or additional processes may be employed. For example, if the information of the RADIUS-request message does not match the information in condition field 502, then access may be still granted (e.g., a quarantine VLAN).

Figure 13:
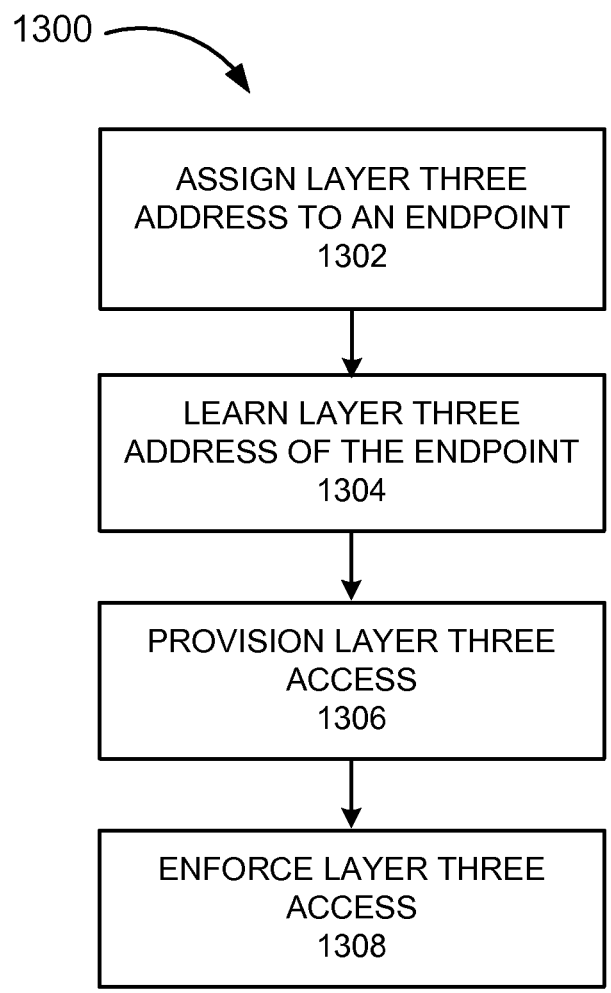
FIG. 13 is a flow chart of an exemplary process for provisioning access through the firewall for the endpoint depicted in FIG. 2.

FIG. 13 is a flow chart of an exemplary process for provisioning access through the firewall for the endpoint depicted in FIG. 2. Exemplary process 1300 is described below in relation to environment 200. For purposes of discussion, assume endpoint 210 has been authenticated and authorized for access to access network 220.

Process 1300 may begin with assigning a layer three address to an endpoint (Block 1302). For example, endpoint 210 may request an IP address from DHCP node 235 using the DHCP protocol. DHCP node 235 may assign an IP address to endpoint 210. For example, IP address assignment application 742 of DHCP node 235 may retrieve an IP address from IP address pool 850 of IP address database 744, and assign the retrieved IP address to endpoint 210. The assigned IP address may be stored in IP address field 802 of IP address table 800, along with a corresponding lease time in lease time field 804. DHCP node 235 may also attain an identifier of endpoint 210, and store the identifier in ID field 806.

The layer three address of the endpoint may be learned (Block 1304). In one implementation, DHCP node 235 may transmit to policy node 230 the IP address assigned to endpoint 210, along with the identifier of endpoint 210 (e.g., a MAC address or character string). Additionally or alternatively, network sensor 240 may scan packets transmitted by endpoint 210 that contain, for example, the MAC address and IP address relating to endpoint 210. Network sensor 240 may communicate the MAC address/IP address pair to policy node 230. Additionally, or alternatively, network access node 225 may monitor packets from endpoint 210 and communicate the identifier (e.g., MAC address/IP address pair) to policy node 230. Policy node 230 may store the IP address of endpoint 210 in network address field 546 of layer three mapping table 446.

Layer three access may be provisioned (Block 1306). For example, policy node 230 may provision layer three access for endpoint 210 through firewall 255. Policy server may send to firewall 255 the IP address of endpoint 210, role of endpoint 210 and/or information about which resources endpoint 210 may be allowed to access in protected network 260, such as a range of network addresses. Firewall 255 may store the range of network addresses (e.g., IP addresses) in IP addresses field 1150 and role in role field 1152 of address/role table 1046. Firewall 225 may store the IP address of endpoint 210 in network address field 1154. Additionally, or alternatively, policy node 230 may send to firewall 225 the identifier of endpoint 210. In this instance, firewall 255 may store the identifier of endpoint 210.

Layer three access may be enforced (Block 1308). In one implementation, firewall 255 may enforce layer three access to protected network 260. For example, firewall 255 may receive a packet including a source network address from endpoint 210. Firewall application 1042 of firewall 255 may refer to address/role table 1046 to match the source network address contained in the received packet with a source network address contained in source network address field 1154. When a match occurs, firewall application 1042 may refer to the associated role accorded to the source network address based on the role in role field 1152. Firewall application 1042 may refer to layer three policy table 1044 based on the accorded role in role field 1152 and take the action specified in action field 1106. For example, endpoint 210 may be accorded the role of IP PHONE, and the received packet may include a destination address to a VOIP server (record 1122). Firewall 255 may permit the received packet to pass to the destination address of the VOIP server based on the range of IP addresses contained IP addresses field 1150. That is, destination address 192.168.1.52 of the VOIP server falls within the range of network addresses 192.168.1.50-192.168.1.99 provided by policy node 230. In other instances, when, for example, the destination network address contained in the received packet from endpoint 210 does not correspond to the accorded role and/or IP addresses field 1150, firewall 255 may prevent the received packet from passing into protected network 260.

CONCLUSION

The foregoing description of implementations provides an illustration, but is not intended to be exhaustive or to limit the implementations to the precise form disclosed. Modifications and variations are possible in light of the above teachings or may be acquired from practice of the teachings. For example, network devices, other than, for example, a DHCP node, a network sensor, or a network access node, may acquire the layer three address of the endpoint. Additionally, or alternatively, approaches for acquiring the layer two address and/or the layer three address of the endpoint, other than, for example, scanning the endpoint, detecting transmissions from the endpoint, or as a result of assigning the layer three address to the endpoint, may be utilized. Still further, authenticating and/or authorization frameworks, other than 802.1X, may be employed.

The descriptions of FIGS. 3, 4, 7, 9, and 10 above each include a discussion of software instructions contained on computer-readable media. Alternatively, in each of these implementations, hardwired circuitry may be used in place of or in combination with software instructions to implement processes described herein. Thus, implementations described herein are not limited to any specific combination of hardware circuitry and software.

In addition, while a series of blocks has been described with regard to the processes illustrated in FIGS. 12-13, the order of the blocks may be modified in other implementations. Further, non-dependent blocks may be performed in parallel. Further, in other implementations, one or more blocks may be omitted.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   applying, by a device and based on a layer two identification, one or more authentication rules to authenticate an endpoint device seeking access to a network;
   determining, by the device, to grant the endpoint device access to the network based on applying the one or more authentication rules;
   determining, by the device and based on determining to grant the endpoint device access to the network, one or more permissions associated with the endpoint device accessing the network;
   providing, by the device and to the endpoint device, information identifying that access to the network is granted;
   receiving, by the device, information identifying a layer three address of the endpoint device from an external device,
   the external device being different than the endpoint device,
   the layer three address being assigned from a pool of layer three addresses to the endpoint device after application of the one or more authentication rules, the layer three address being associated with the one or more permissions, and the layer three address being valid only for a particular amount of time that is determined based on an estimated amount of time layer three access for the endpoint device to the network is needed, the particular amount of time being different for different endpoint devices associated with other layer three addresses from the pool; and provisioning, by the device, layer three access for the endpoint device to the network for the particular amount of time based on the layer three address and the one or more permissions, after the particular amount of time, the endpoint device being denied access to the network.

2. The method of claim 1, further comprising:
detecting transmissions from the endpoint device; and
determining the layer two identification based on the transmissions.

3. The method of claim 1, further comprising:
determining a media access control address associated with the endpoint device; and
determining the layer two identification based on the media access control address.

4. The method of claim 1, where provisioning the layer three access includes:
providing the information identifying the layer three address and information identifying the one or more permissions to a firewall device.

5. The method of claim 1, where determining the one or more permissions includes:
determining, based on the layer two identification, that a condition, for associating the endpoint device with a role, is satisfied,
the role defining the one or more permissions associated with the endpoint device,
determining to associate the endpoint device with the role based on the condition being satisfied, and
where the method further comprises:
granting the one or more permissions to the endpoint device based on the endpoint device being associated with the role.

6. The method of claim 5, where determining that the condition is satisfied includes:
determining that the endpoint device includes a particular version of anti-virus software.

7. The method of claim 1, where determining the one or more permissions includes:
identifying a layer two resource associated with the layer two identification, and
determining the one or more permissions based on the layer two resource being associated with the layer two identification.

8. The method of claim 1, further comprising:
providing, by the device and to the endpoint device, information identifying a layer two permission based on determining to grant the endpoint device access to the network; and
where receiving the information identifying the layer three address of the endpoint device from the external device is based on providing the information identifying the layer two permission to the endpoint device.

9. The method of claim 1, where receiving the information identifying the layer three address of the endpoint device from the external device includes:

receiving the information identifying the layer three address from the external device based on a request from the endpoint device to the external device.

10. A device comprising:
one or more computer processors to:
authenticate, based on a layer two identification, an endpoint device seeking access to a network;
determine to grant the endpoint device access to the network based on authenticating the endpoint device;
determine, based on determining to grant the endpoint device access to the network, one or more permissions associated with the endpoint device accessing the network;
provide, to the endpoint device, information identifying that access to the network is granted;
receive, based on providing the information identifying that access to the network is granted, information identifying a layer three address of the endpoint device from an external device,
the external device being different than the endpoint device,
the layer three address being assigned from a pool of layer three addresses to the endpoint device after the endpoint device is authenticated,
the layer three address being associated with the one or more permissions, and
the layer three address being valid only for a particular amount of time that is determined based on an estimated amount of time layer three access for the endpoint device to the network is needed,
the particular amount of time being different for different endpoint devices associated with other layer three addresses from the pool; and
provision layer three access for the endpoint device to the network for the particular amount of time based on the layer three address and the one or more permissions,
after the particular amount of time, the endpoint device being denied access to the network.

11. The device of claim 10, where the one or more computer processors are further to:
receive, from a sensor device, information detected from data transmitted from the endpoint device,
the sensor device being different from the device; and
determine the layer two identification based on the information received from the sensor device.

12. The device of claim 10, where the one or more computer processors are further to:
determine a media access control address associated with the endpoint device; and
determine the layer two identification based on the media access control address.

13. The device of claim 10, where, when provisioning the layer three access, the one or more computer processors are to:
provide the information identifying the layer three address and information identifying the one or more permissions to a firewall device.

14. The device of claim 10, where, when determining the one or more permissions, the one or more computer processors are to:
determine, based on the layer two identification, that a condition associated with the endpoint device is satisfied, and
where the one or more computer processors are to:
grant the one or more permissions to the endpoint device based on the condition being satisfied.

15. The device of claim 14, where, when determining that the condition is satisfied, the one or more computer processors are to:

determine that the endpoint device is virus-free.

16. The device of claim 10, where, when determining the one or more permissions, the one or more computer processors are to:

identify, based on a mapping of layer two resources and layer two identifications, a layer two resource associated with the layer two identification, and determine the one or more permissions based on the layer two resource.

17. A non-transitory computer-readable medium storing instructions, the instructions comprising:

one or more instructions that, when executed by one or more computer processors of a device, cause the one or more computer processors to:

determine to grant an endpoint device access to a network based on applying one or more authentication rules;

determine, based on determining to grant the endpoint device access to the network, one or more permissions associated with the endpoint device accessing the network;

provide, to the endpoint device, information identifying that access to the network is granted;

receive, based on providing the information identifying that access to the network is granted, information identifying a layer three address of the endpoint device from an external device, the external device being different than the endpoint device, the layer three address being assigned from a pool of layer three addresses to the endpoint device after application of the one or more authentication rules, the layer three address being associated with the one or more permissions, and the layer three address being valid only for a particular amount of time that is determined based on an estimated amount of time layer three access for the endpoint device to the network is needed, the particular amount of time being different for different endpoint devices associated with other layer three addresses from the pool; and cause the endpoint device to be provisioned for layer three access to the network for the particular amount of time based on the layer three address and the one or more permissions, after the particular amount of time, the endpoint device being denied access to the network.

18. The non-transitory computer-readable medium of claim 17, where the instructions further comprise:

one or more instructions that, when executed by the one or more computer processors, cause the one or more computer processors to:

determine a media access control address associated with the endpoint device;

determine a vendor associated with the endpoint device based on the media access control address; and determine a layer two identification based on the vendor associated with the endpoint device; and where the one or more instructions to determine to grant the endpoint device access to the network include:

one or more instructions that, when executed by the one or more computer processors, cause the one or more computer processors to:

determine to grant the endpoint device access to the network based on the layer two identification.

19. The non-transitory computer-readable medium of claim 18, where the one or more instructions to determine the one or more permissions include:

one or more instructions that, when executed by the one or more computer processors, cause the one or more computer processors to:

determine, based on the layer two identification, that a condition, for associating the endpoint device with a role, is satisfied, the role defining the one or more permissions associated with the endpoint device, and the condition being satisfied when one or more of:

the endpoint device includes a particular version of security software, or the endpoint device is determined to not have a virus, determine to associate the endpoint device with the role based on the condition being satisfied, and determine to grant the one or more permissions to the endpoint device based on the endpoint device being associated with the role.

20. The non-transitory computer-readable medium of claim 18, where the one or more instructions to determine the one or more permissions include:

one or more instructions that, when executed by the one or more computer processors, cause the one or more computer processors to:

identify a layer two resource associated with the layer two identification, and determine the one or more permissions based on the layer two resource being associated with the layer two identification.

\* \* \* \* \*